United States Patent [19]

Bowser et al.

[11] Patent Number: 4,593,175

[45] Date of Patent: Jun. 3, 1986

[54] ELECTRICAL CONDUIT WITH INTEGRAL MOISTURE-VAPOR BARRIER

[75] Inventors: George H. Bowser, New Kensington; Stanley J. Pysewski, Cheswick; Renato Chiesuzzi, Tarentum, all of Pa.

[73] Assignee: PPG Industries, Inc., Pittsburgh, Pa.

[21] Appl. No.: 701,325

[22] Filed: Feb. 13, 1985

[51] Int. Cl.[4] .................................... B60L 1/02

[52] U.S. Cl. .................................... 219/203; 338/312; 174/23 R; 219/522

[58] Field of Search ............... 219/203, 522, 541, 544; 174/23 R; 338/312, 322, 324

[56] References Cited

U.S. PATENT DOCUMENTS

| | | | |
|---|---|---|---|
| 1,952,191 | 3/1934 | Arutunoff | 174/115 X |
| 3,399,294 | 8/1968 | Thieben | 219/522 |
| 3,449,551 | 6/1969 | Aisanich | 219/522 X |
| 3,467,818 | 9/1969 | Ballentine | 219/522 |
| 3,710,074 | 1/1973 | Stewart | 219/203 |
| 3,760,157 | 9/1973 | Newman et al. | 219/522 |
| 3,876,862 | 4/1975 | Newman et al. | 219/509 |
| 4,262,913 | 4/1981 | Parfree et al. | 174/23 R X |
| 4,306,140 | 12/1981 | Stromquist | 219/522 |
| 4,319,074 | 3/1974 | Yaste et al. | 174/23 R X |
| 4,520,602 | 6/1985 | Miller | 219/522 |

*Primary Examiner*—Clarence L. Albritton
*Assistant Examiner*—M. M. Lateef
*Attorney, Agent, or Firm*—Robert A. Westerlund, Jr.

[57] ABSTRACT

A braided, composite lead-in conduit for use in conducting electricity to electroconductive heating means of a heated, multiple-glazed window has spaces between individual wires filled with a substantially moisture impervious material to minimize mositure-vapor penetration into the insulating air space of the window.

8 Claims, 5 Drawing Figures

ELECTRICAL CONDUIT WITH INTEGRAL MOISTURE-VAPOR BARRIER

FIELD OF THE INVENTION

This invention relates to an electrical lead-in conduit for use in conducting electricity to heater means of a heated, multiple-glazed window, and more particulary, to a conduit having a moisture-vapor barrier means integral thereto for minimizing the rate of moisture-vapor transmission therethrough and into the insulating air space of the window.

BACKGROUND OF THE INVENTION

In the art of heated, multiple-glazed windows, electrical lead-in conduits are employed to conduct electricity from a suitable power source to electroconductive heater means carried by a one of the window panes to heat the pane to prevent the buildup of condensation, ice, fog or the like thereon. The lead-in conduits commonly employed are composite conduits made of individual wires usually comprised of copper, braided together. Reference may be made to U.S. Pat. No. 3,467,818, for a teaching of a heated window having a lead-in conduit which is representative of the lead-in conduits employed in the pertinent art.

The currently available lead-in conduits have limitations and drawbacks, especially when employed within the context of heated, multiple-glazed windows. More particularly, the spaces between the individual wires of a composite, braided lead-in conduit permit moisture-vapor penetration therethrough into the insulating air space between the opposed panels of a heated, multiglazed window. Otherwise stated, these spaces establish moisture-vapor transmission paths from the outside to the insulating air space of the window. It would be desirable to have a lead-in conduit which at least substantially reduces the rate of moisture-vapor transmission into the insulating air space of a heated, multiple-glazed window.

SUMMARY OF THE INVENTION

The present invention encompasses an electrical lead-in conduit for use in conveying electricity to electroconductive/resistive heater means carried by a one of the panes of an electrically heatable, multiple-glazed window. The lead-in conduit is a composite, braided lead-in conduit having the spaces between its individual wires at least substantially filled with a substantially moisture impervious material to at least substantially reduce the rate of mositure-vapor transmission through the spaces into the air space between the opposed panes of the window, to thereby improve the performance and extend the useful life of the window.

DESCRIPTION OF THE INVENTION

Figure 1:
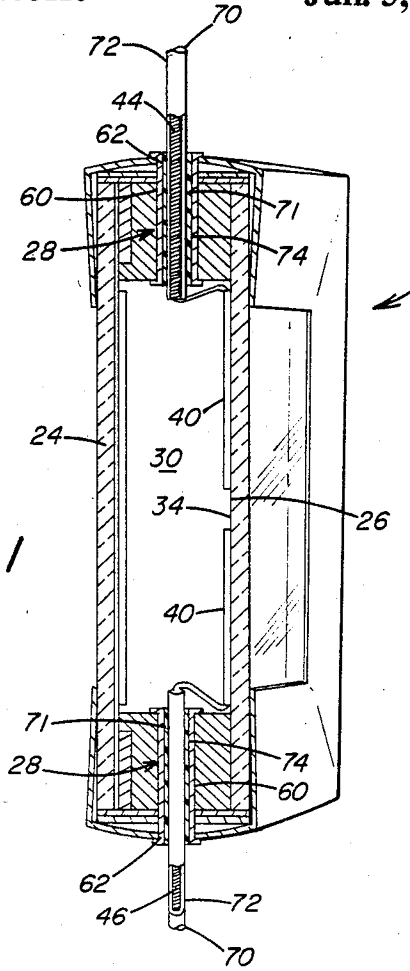
FIG. 1 is a cross-sectional, elevational view of a heatable, multiple-glazed window having electrical lead-in conduits embodying features of this invention.
Figure 5:
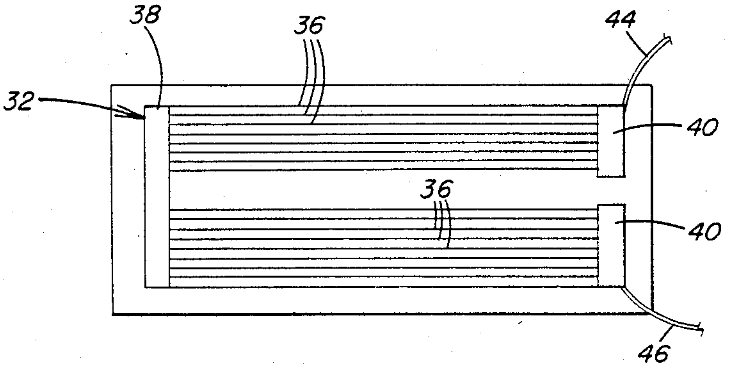
FIG. 5 is an isolated, plan view of the outside pane of the window of FIG. 1.

Referring now to FIG. 1, there can be seen a heatable, multiple-glazed window 22 suitable for use in the practice of this invention. The window 22 has a pair of glass panes 24, 26 held by a spacer/sealant assembly 28 in parallel, spaced apart relationship to each other. The spacer/sealant assembly 28 further serves to hermetically seal the enclosed, insulating air space 30 between the opposed panes 24,26. Referring also to FIG. 5, an electroconductive heater grid 32 is applied to the airspace-side surface 34 of the pane 26 in any convenient manner, e.g. by a "silk-screening" and "firing" process such as is taught in U.S. Pat. Nos. 3,638,564; 3,813,519; 3,852,564; 3,703,445 and 3,721,594, the teachings of which are herein incorporated by reference. The heater grid 32 is comprised of an array of thin, parallel, substantially equally spaced apart resistive heating elements or heater lines 36, interconnecting bus bars 38,40. The heater lines 36 and the bus bars 38, 40 are suitably composed of a conductive ceramic paste material, e.g. a silver ceramic paste. The bus bars 38,40 and the heater lines 36 constitute integral parts of a one-piece, generally coplanar grid 32 which is fused to the surface 34 of the pane 26, as by a first layer or strata of metallic silver particles applied in a paste-like medium and subjected to fusing temperature, generally a temperature of between about 1000° F.(600° C.) to about 1500° F.(800° C.). Although the heater grid 32 has been described as being comprised of an array of heater lines interconnecting opposed bus bars, e.g. such as is taught in Application Ser. No. 690,292, for an invention entitled "Architectural Window Having Integral Snow Melting Features", filed in the name of Ray Gallagher in January 1985, which is assigned to the assignee of the present invention, the teachings of which are herein incorporated by reference, it should be clearly understood that the type of electric heater means employed is not limiting to this invention. For example, instead of being a heater grid, the electric heating means can be of the electroconductive coating type, e.g. such as is taught in U.S. Pat. Nos. 3,609,293; 3,710,074 and 3,629,554, the teachings of which are herein incorporated by reference. Further, the glass panes 24,26 can be colored, tinted, clear, coated, tempered, or have other strength, solar energy control and/or optical properties appropriate to the environment in which the window 22 is employed. The type and/or composition of the panes 24, 26 is not limiting to this invention.

Figure 2:
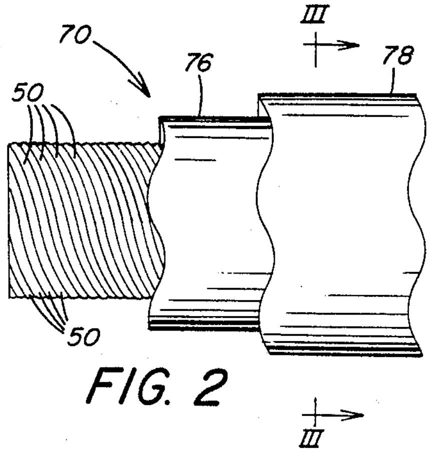
FIG. 2 is a fragmentary, cutaway view of an electrical lead-in conduit embodying features of this invention.
Figure 3:
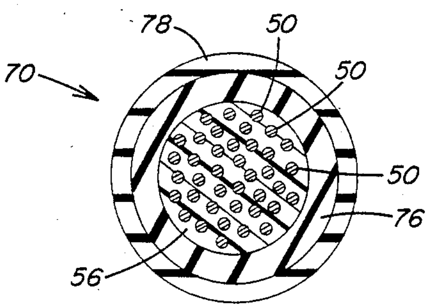
FIG. 3 is an end, cross-sectional view of the conduit of FIG. 2 taken between the lines A—A and B—B.
Figure 4:
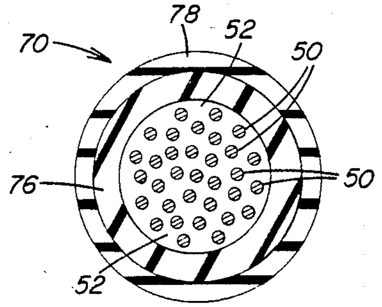
FIG. 4 is the same view as FIG. 3, except with the spaces between individual wires of the conduit unfilled.

Electrical power for the heating grid 32 is suitably provided by any convenient AC or DC power source (not shown) and is supplied to the heater-grid 32 by composite, braided lead-in conduit 44,46 incorporating features of this invention. Referring additionally to FIGS. 2 and 3, the composite, braided lead-in conduits 44,46 each preferably comprises a plurality of individual wires 50 composed of any convenient electroconductive material, e.g. copper, tin, nickel, or the like, braided together in any convenient manner as is widely known in the pertinent art, Referring particularly to FIG. 4, there can be seen to exist spaces 52 between the individual wires 50 of the composite, braided lead-in conduits 44,46. The spaces 52 allow moisture and/or vapor to pass or travel therethrough into the insulating air space 30. The spaces 52 thus establish moisture-vapor transmission paths extending from the outside of the window 22 to the air space 30, thereby undesirably raising the frost point of the window 22 and reducing the useful lift of the window 22. In accordance with the teachings of this invention, the spaces 52 between the wires 50 are at least substantially filled with a substantially moisture impervious material to at least substantially reduce the rate of moisture-vapor transmission from the window 22 exterior into the insulating air space 30. Referring to FIG. 3, the moisture impervious material 56 is preferably selected to have a viscosity within a range of from about 20% solids content to about 40% solids content, although this preferred range is not limiting to the invention. A preferred moisture impervious material is a solvent-based butyl paint.

Referring particularly to FIG. 1, there can be seen passageways 60 provided through the spacer/sealant assembly 28, the passageways 60 extending from the window 22 exterior to the insulating air space 30. A grommet 62, suitably made of brass or any other convenient strong and durable material, or any other convenient securement fixture, is mounted through each passageway 60 to the spacer/sealant assembly 28. The composite, braided lead-in conduits 44,46 are each insulatingly protected by an insulating sheath or sleeve 70 made of heat-shrinkable material, e.g. polyvinylchloride. The lead-in conduits 44,46 are passed through the grommets 62, and have one end (not shown) electrically connected to the bus bars 40, in any convenient manner, e.g. such as is taught in U.S. Pat. Nos. 3,467,818 issued to Ballentine and 3,659,079 issued to Whittemore, the teachings of which are herein incorporated by reference. The opposite end (not shown) of each of the lead-in conduits 44,46 is electrically connected to any convenient AC or DC power source (not shown) as is widely known in the pertinent art. The spaces 71 between the outside, circumferential surfaces 72 of the sleeves 70 and the inside walls or surfaces 74 of the grommets 62 are suitably filled or sealed with a moisture impervious, adhesive primary sealant material, e.g. such as an adhesive sealant material sold by PPG Industries under their registered trademark PPG 442 ® sealant, or an adhesive sealant material sold by National Adhesives, Inc. under their registered trademark DCL 469 ® sealant, to thereby provide a mositure-vapor barrier throughout the spaces 71, to at least substantially eliminate the migration or penetration of moisture or vapor from the window 22 exterior to the air space 30, through the spaces 71.

It will be appreciated that any moisture, vapor or condensate which may be developed on the lead-in conduits 44,46 at their terminal end connection points to the power source (not shown), e.g. due to a high humidity window 22 exterior atmosphere condition or the like, will be effectively blocked from moving through the spaces 52 between the individual wires 50 of the composite, braided lead-in conduits 44,46 into the air space 30, by the moisture impervious material 56 which effectively provides a mositure-vapor barrier to mositure-vapor transmission via the spaces 52.

DETAILED DESCRIPTION OF ACTUAL PRACTICE

In actual practice, a first lead-in conduit 44 was fabricated in the following described manner. A composite, braided copper conduit was dipped into a butyl solution composition described hereinbelow in TABLE I, to coat a 3½ inch (8.9 cm) portion of the wire therewith. The coated, braided conduit was then treated in an air circulating oven at about 350° F. (184° C.) for about 15 minutes. An approximately 3½ inch (8.9 cm) length or first sleeve 76 of a heat-shrinkable tubing made of polyvinylchloride, e.g. FIT ® Shrinkable Tubing sold by Leff Electronics, Inc. of Braddock, Pa., having a 3/16 inch (0.47 cm) diameter, was then positioned around or sleeve-fit over the coated or primed portion of the lead-in conduit, and then heated in an oven at about 350° F. (184° C.) for approximately 5 minutes. Another approximately 3½ inch (8.9 cm) length 78 of heat-shrinkable tubing identical in diameter and composition to the aforedescribed first sleeve 76 was then sleeve-fit over the first sleeve, and then heated in an oven at about 350° (184° C.) for about 15 minutes. The overall length of the thusly fabricated lead-in conduit 44 was twelve inches (30.5 cm) (i.e. one foot). A second lead-in conduit 46 was fabricated in substantially exactly the same manner as the first lead-in conduit 44. The first and the second lead-in conduits 44,46 were then utilized in the construction of a 12 inch (30.5 cm)×12 inch (30.5 cm)×¾ inch (1.9 cm) heatable, double-glazed window having a spacer/sealant assembly 28 containing about one gram of molecular sieve desiccant with an absorbing power of about 0.2 grams of water, dispersed therethroughout, which is evident as a frost point of 0° F.(−18C.), within a high humidity 140° F.(78° C.) atmosphere. A double-glazed window without the lead-in conduits 44,46 but having the same dimensions and spacer/sealant assembly 28 construction was also constructed. The double-glazed window without the lead-in conduits 44,46 performed satisfactorily for more than 25 days at 140° F.(78° C.), and the heatable double glazed window having the lead-in conduits 44,46 of this invention and entry grommets 62 displayed a 0° F.(−18° C.) frost point after about 24 days, under identical conditions. Another heatable, double-glazed window having lead-in conduits not dipped in the butyl solution (i.e without the spaces 52 between the individual wires 50 of the composite, braided lead-in conduits 44,46 filled with a moisture impervious material), but having the same dimensions and spacer/sealant assembly construction as the other two aforedescribed double-glazed window units, was constructed and tested under the same conditions as the other two windows (i.e high humidity 140° F.(78° C.) atmosphere). The latter unit showed a 0° F.(−18° C.) frost point within seven days.

TABLE I

PPG Butyl Coating No. 2

| Materials | Amount (by Weight in grams) |
|---|---|
| 1. Butyl 165 ® | 100 |
| 2. Vistanex LM,MS ® | 30 |
| 3. StatexG ® | 50 |
| 4. ZnO | 5 |
| 5. Escorez 1315 ® | 60 |
| 6. SP-1055 ® | 10 |
| 7. VM + P Naphtha (Solvent) | 420 |
| Total Weight | 675 |
| Total Weight, Excl. Solvent | 255 |

TABLE I-continued

| PPG Butyl Coating No. 2 | |
|---|---|
| Materials | Amount (by Weight in grams) |
| Solids/Solvents Ratio | $\frac{255}{675} = 37.7\%$ |

(1)Butyl 165 ® is the registered trademark of Exxon Chemical Company's isobutylene-isoprene elastomers (IIR's).
(2)Vistanex LM.MS ® is the registered trademark of Exxon Chemical Company's polyisobutylene resin.
(3)StatexG ® is the registered trademark of Columbian Chemical Company's amorphous furnace black - general purpose black.
(4)Zinc Oxide (ZnO) xx4 grade is manufactured by New Jersey Zinc Company.
(5)Escorez 1315 ® is the registered trademark of Exxon Chemical Company's saturated hydrocarbon resin.
(6)SP-1055 ® is the registered trademark of Schenutady Chemicals, Inc. for its bromolthylated alkyl phenol formaldehyde resin.
(7)VM + P Naptha is varnish makers' naphtha, a solvent with a narrow boiling range.

It should be clearly understood that the type and/or composition of moisture-vapor impervious material 56 employed to fill the spaces 52 between the individual wires 50 of the composite, braided lead-in conduits 44,46 is not limiting the invention. However, for the above-described PPG Butyl Coating No. 2, it is preferred that the solids non-solvent content/overall content ratio be within the range of about 20% solids contents to about 40% solids content. The viscosity becomes too great beyond the 40% solids level and too low below the 20% solids level to achieve satisfactory filling of the spaces 52. It should also be clearly understood that the inventive concept herein taught may be practiced with any electrical conductor having spaces, gaps, holes, channels, cavities or any other moisture-vapor transmission path, utilized as a lead-in conduit to an electrical circuit disposed in an environment in which moisture-vapor ingress is to be minimized or prevented. The scope of the present invention should not be limited by the specific embodiment(s) herein taught, but should be interpreted solely on the basis of the following, appended claims.

What is claimed is:

1. In a heatable multiple-glazed window comprised of two or more panes held in spaced apart relation by a spacer/sealant assembly defining a sealed insulating air space between the panes, and an electroconductive heater means applied to the air space facing surface of a one of the panes, a conduit for conducting electrical current from an electric power source to the electroconductive heater means, the electric power source being disposed exteriorly of the insulating air space, the conduit comprising:

a plurality of electrical wires braided together;

a first moisture-vapor substantially impervious material at least substantially filling spaces occurring between said wires; and an electrically insulating sheath sealingly enclosing said braided together wires.

2. The conduit as set forth in claim 1, wherein the spacer/sealant assembly has a grommet secured therethrough, and wherein further, the conduit passes through said grommet.

3. The conduit as set forth in claim 2, wherein said electrically insulating sheath comprises a first protective sleeve and a second protective sleeve sealingly bonded together.

4. The conduit as set forth in claim 3, wherein said first and said second protective sleeves are each comprised of heat shrinkable material.

5. The conduit as set forth in claim 4, wherein said heat shrinkable material comprises a polyvinylchloride-containing material.

6. The conduit as set forth in claim 2, wherein any spaces occurring between the outer surface of said electrically insulating sheath and the inner surface of said grommet are at least substantially filled with a second moisture-vapor substantially impervious material.

7. The conduit as set forth in claim 6, wherein said first and said second substantially moisture-vapor impervious materials are the same.

8. The conduit as set forth in claim 6, wherein said first and said second substantially moisture-vapor impervious materials are different.

* * * * *

UNITED STATES PATENT AND TRADEMARK OFFICE
CERTIFICATE OF CORRECTION

PATENT NO. : 4,593,175

DATED : June 3, 1986

INVENTOR(S) : George H. Bowser, Stanley J. Pyzewski and Renato Chieruzzi

It is certified that error appears in the above-identified patent and that said Letters Patent is hereby corrected as shown below:

On the cover page under Inventors:

"Chiesuzzi" should be --Chieruzzi--.

Signed and Sealed this

*Twenty-sixth* Day of *August 1986*

[SEAL]

*Attest:*

DONALD J. QUIGG

*Attesting Officer* *Commissioner of Patents and Trademarks*